(12) United States Patent
Chen

(10) Patent No.: US 11,682,829 B2
(45) Date of Patent: Jun. 20, 2023

(54) MOUNTING DEVICE AND BASE STATION ANTENNA SYSTEM

(71) Applicant: CommScope Technologies LLC, Hickory, NC (US)

(72) Inventor: Chen Chen, Jiangsu (CN)

(73) Assignee: CommScope Technologies LLC, Hickory, NC (US)

( * ) Notice: Subject to any disclaimer, the term of this patent is extended or adjusted under 35 U.S.C. 154(b) by 34 days.

(21) Appl. No.: 17/380,600

(22) Filed: Jul. 20, 2021

(65) Prior Publication Data
US 2022/0029276 A1  Jan. 27, 2022

(30) Foreign Application Priority Data

Jul. 23, 2020  (CN) .......................... 202010715086.1

(51) Int. Cl.
*H01Q 1/12* (2006.01)
*H01Q 1/24* (2006.01)
*H04W 88/08* (2009.01)

(52) U.S. Cl.
CPC .......... *H01Q 1/246* (2013.01); *H04W 88/085* (2013.01)

(58) Field of Classification Search
CPC .......... H01Q 1/246; H01Q 1/12; H01Q 1/1207
See application file for complete search history.

(56) References Cited

FOREIGN PATENT DOCUMENTS

| EP | 3869612 A1 * | 8/2021 | ............. H01Q 1/246 |
|---|---|---|---|
| WO | 2016036951 A1 | 3/2016 | |
| WO | 2020022834 A1 | 1/2020 | |
| WO | 2020072880 A1 | 4/2020 | |

OTHER PUBLICATIONS

"Extended European Search Report corresponding to European Application No. 21187012.6 dated Dec. 6, 2021".

* cited by examiner

*Primary Examiner* — Hoang V Nguyen
(74) *Attorney, Agent, or Firm* — Myers Bigel, P.A.

(57) ABSTRACT

The invention relates to a mounting device for mounting a remote radio unit to a base station antenna, including: a single guide rail (4) configured to be mounted to the base station antenna (1) and extending transversely in a mounting state of the guide rail on the base station antenna; a guide element (8) configured to be mounted to the remote radio unit (2) and movable along the guide rail in a mounted state of the guide element on the remote radio unit; and a fixing device such as a plurality of quick locking devices (10) configured to fix the remote radio unit on the base station antenna at a predetermined installation position of the remote radio unit relative to the base station antenna. The invention also relates to a base station antenna system, which includes a base station antenna, a remote radio unit and the above-mentioned mounting device. By use of such a mounting device, the remote radio unit may be easily mounted on the base station antenna, and the whole base station antenna system is compact in structure.

12 Claims, 5 Drawing Sheets

MOUNTING DEVICE AND BASE STATION ANTENNA SYSTEM

RELATED APPLICATION

The present invention claims priority from and the benefit of Chinese Patent Application No. 202010715086.1, filed Jul. 23, 2020, the disclosure of which is hereby incorporated herein by reference in full.

FIELD OF THE INVENTION

The disclosure relates to the field of base station antennas, and more particularly, to a mounting device for mounting a remote radio unit (RRU) to a base station antenna (BSA), and a BSA system.

BACKGROUND OF THE INVENTION

In a wireless communication network, a BSA may be provided with a remote radio unit (RRU), which may be electrically connected with each other through jumper lines. Typically, a BSA and a RRU may be separately mounted on different poles, so the BSA and the RRU need separate installation spaces. A relative position of the BSA and the RRU may only be determined at an installation site, so a length of the jumper lines for electrically connecting the BSA and the RRU cannot be determined in advance.

For some BSA, it may be mounted to a pole first, and then a RRU associated with it may be mounted to it, where the RRU is suspended and moved to a predetermined installation position during the mounting process. However, the orientation of the heavy RRU under the action of gravity may be different from that required during installation, and a rope for suspending the RRU may interfere with surrounding objects during installation, which may make the installation of the RRU difficult.

SUMMARY OF INVENTION

An object of the disclosure is to provide a mounting device for mounting a RRU to a BSA and a BSA system including a BSA and a RRU, wherein the RRU may be easily mounted and dismounted.

According to a first aspect of the invention, there is proposed a mounting device for mounting a RRU to a BSA, the mounting device including:

a guide rail configured to be mounted to the BSA and extending transversely in a mounted state of the guide rail on the BSA; and a guide element configured to be mounted to the RRU and movable along the guide rail in a mounted state of the guide element on the RRU.

Such a mounting device has a simple structure, may be manufactured inexpensively, and may facilitate the mounting and dismounting of the RRU on the BSA. Here, by means of the guide rail, the RRU may be easily push into the guide rail.

In some embodiments, the device further comprises a fixing device configured to fix the RRU on the BSA at a predetermined installation position of the RRU relative to the BSA.

In some embodiments, the guide rail may have opposite side walls, which extend transversely and are configured to receive and guide the guide element between themselves in a mounted state of the guide rail on the BSA.

In some embodiments, the side walls may be parallel to each other or define an angle.

In some embodiments, the guide rail may have a row of rollers that define a guide path for the guide element. By means of these rollers, the RRU may be easily pushed into and removed from the guide rail.

In some embodiments, the mounting device may include an adapter plate configured to be mounted to the RRU.

In some embodiments, the guide element may be an integral part of the adapter plate.

In some embodiments, the guide element may be a separate part from the adapter plate.

In some embodiments, the guide element may be an integral part of a housing of the RRU.

In some embodiments, the mounting device may include a mounting frame configured to be mounted to the BSA.

In some embodiments, the guide rail may be mounted to the mounting frame.

In some embodiments, the fixing device may be configured to fix the RRU to the mounting frame.

In some embodiments, the mounting frame may include two longitudinal beams that are parallel to each other and two connecting elements that connect the longitudinal beams to each other at ends of the longitudinal beams, and the connecting elements are configured to mount the BSA to a pole.

In some embodiments, the fixing device may include a plurality of quick locking devices configured to lock the RRU on the BSA at the predetermined installation position.

In some embodiments, the fixing device may include four quick locking devices configured to lock the adapter plate to the longitudinal beams, wherein each longitudinal beam is associated with two quick locking devices spaced apart from each other.

In some embodiments, the guide rail may be below the RRU when the RRU is mounted to the BSA.

In some embodiments, the guide rail may be above the RRU when the RRU is mounted to the BSA.

According to a second aspect of the invention, a BSA system is proposed, which includes a BSA and a RRU and a mounting device according to the first aspect of the invention.

In some embodiments, the BSA and the RRU may be pre-assembled by means of the mounting device and then mounted to a pole as a structural unit.

In some embodiments, the BSA may be first mounted to a pole, and then the RRU may be mounted to the BSA by means of the mounting device.

Above-mentioned technical features, technical features to be mentioned below and technical features obtained in the drawings may be arbitrarily combined with each other, as long as they are not contradictory. All technically feasible feature combinations are technical contents contained in the disclosure.

BRIEF DESCRIPTION OF DRAWINGS

The present invention will be explained in more detail by means of specific embodiments with reference to the accompanying drawings. Among them.

EMBODIMENTS

Now, a BSA system according to an embodiment of the present invention and a mounting device 3 for mounting a RRU 2 to a BSA 1 will be explained with reference to FIGS. 1 to 5.

Figure 1:
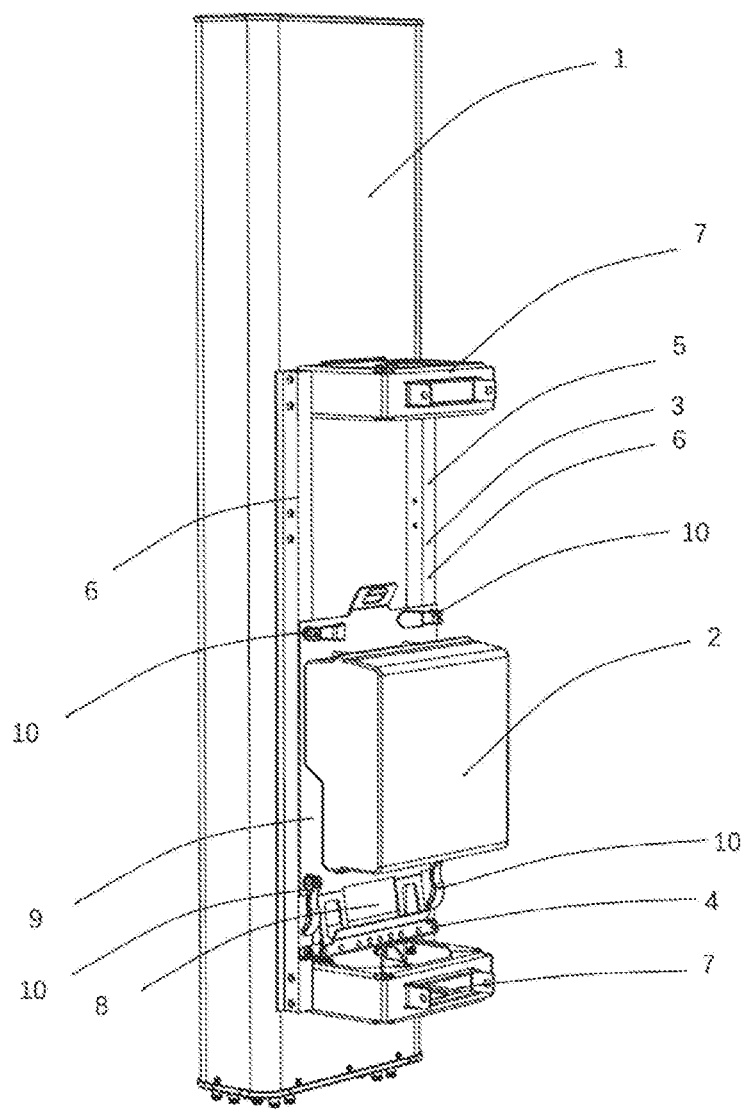
FIG. 1 is a perspective view of a BSA system according to an embodiment of the present invention.
Figure 2:
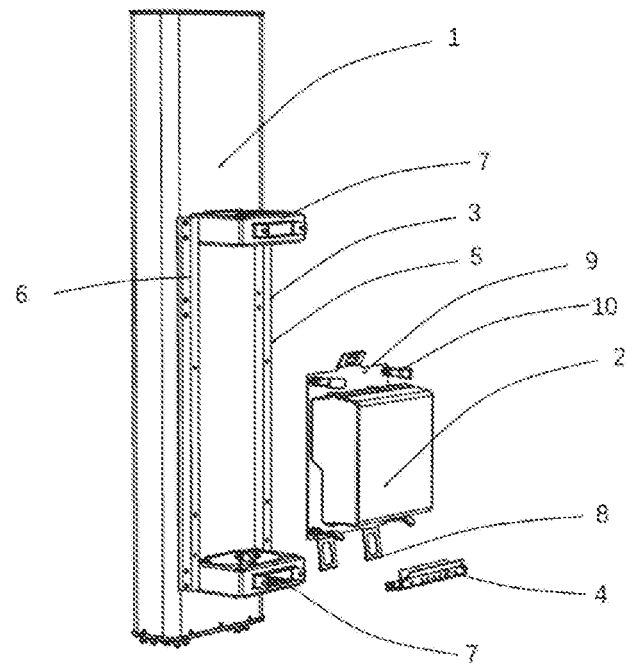
FIG. 2 is an exploded view of the BSA system of FIG. 1.

FIG. 1 is a perspective view of a BSA system according to an embodiment of the present invention, and FIG. 2 is an exploded view of the BSA system of FIG. 1. As shown in FIGS. 1 and 2, the BSA system includes a BSA 1 and a RRU 2, wherein the RRU 2 is mounted to the BSA 1 by means of a mounting device 3. The BSA 1 and the RRU 2 may be preassembled by means of the mounting device 3, and then mounted to a pole through connecting elements 7 and clamping devices connected with the connecting element 7, where the pole and the clamping devices are not shown. It will also be appreciated that the BSA 1 is first mounted to the pole, and then the RRU 2 is mounted to the BSA 1 by means of the mounting device 3. To this end, first, a single guide rail 4 may be mounted to the BSA 1 and a guide element 8 may be mounted to the RRU 2. Then, the RRU 2 may be laterally pushed into the guide rail 4 by use of the guide element 8, until the RRU reaches a predetermined installation position relative to the BSA 1, and finally, the RRU 2 is fixed on the BSA 1 by means of a fixing device. In a mounted state of the guide rail 4 on the BSA 1, the guide rail 4 extends transversely. The guide element 8 can move along the guide rail 4. When service to the BSA system is required, the RRU 2 may also be detached from the BSA 1, wherein the fixing device may be loosened first, and then the RRU 2 may be moved out of the guide rail 4 by use of the guide element 8.

The mounting device 3 may include a mounting frame 5 to be mounted to the BSA 1; for example, it may be fixed on a radome of the BSA 1 by means of bolt connections. The mounting frame 5 may include two parallel longitudinal beams 6 and two connecting elements 7 connecting the two longitudinal beams at ends of the two longitudinal beams. The two connecting elements 7 may be connected with respective clamping devices (not shown), which may be fixed on a pole not shown.

The mounting device 3 may include an adapter plate 9 to be mounted to the RRU 2, and the guide element 8 may be an integral part of the adapter plate 9. It will also be appreciated that the guide element 8 and the adapter plate 9 may be parts separate from each other and mounted to the RRU 2 respectively.

Figure 3:
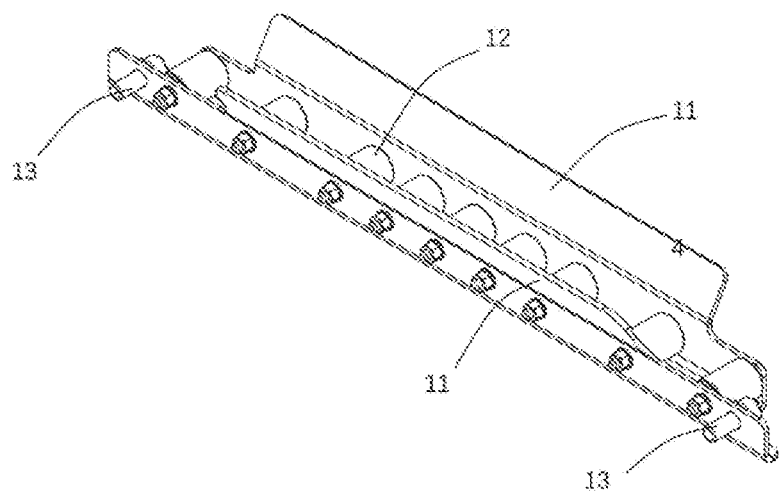
FIG. 3 is a perspective view of a guide rail of a mounting device of the BSA system of FIG. 1.

FIG. 3 is a perspective view of the guide rail 4 of the mounting device 3 of the BSA system of FIG. 1. The guide rail 4 may have opposite side walls 11 that extend transversely and are configured to receive and guide the guide element 8 between themselves in a mounted state of the guide rail 4 on the BSA 1. The side walls 11 may define an angle so that the guide element 8 can be easily pushed into the guide rail 4. The guide rail 4 may have a row of rollers 12 that define a guide path for the guide element 8. Only one of the rollers is provided with the reference numeral 12 in FIG. 3. The guide rail 4 may be directly fixed on the radome of the BSA 1. However, in the embodiment shown in FIG. 3, the guide rail 4 may also be fixed to the two longitudinal beams 6 of the mounting frame 5 by means of bolt connections 13, and thus indirectly fixed to the BSA 1. When the RRU 2 is mounted to the BSA 1, the guide rail 4 may be below the RRU 2. The guide element 8 may have a recess, which may be moved above one of the rollers in the predetermined installation position of the RRU 2, where the guide element 8 may be slightly lowered, and the roller is partially received in the recess. Thereby, the predetermined installation position of the RRU 2 may be clearly perceived.

Figure 4:
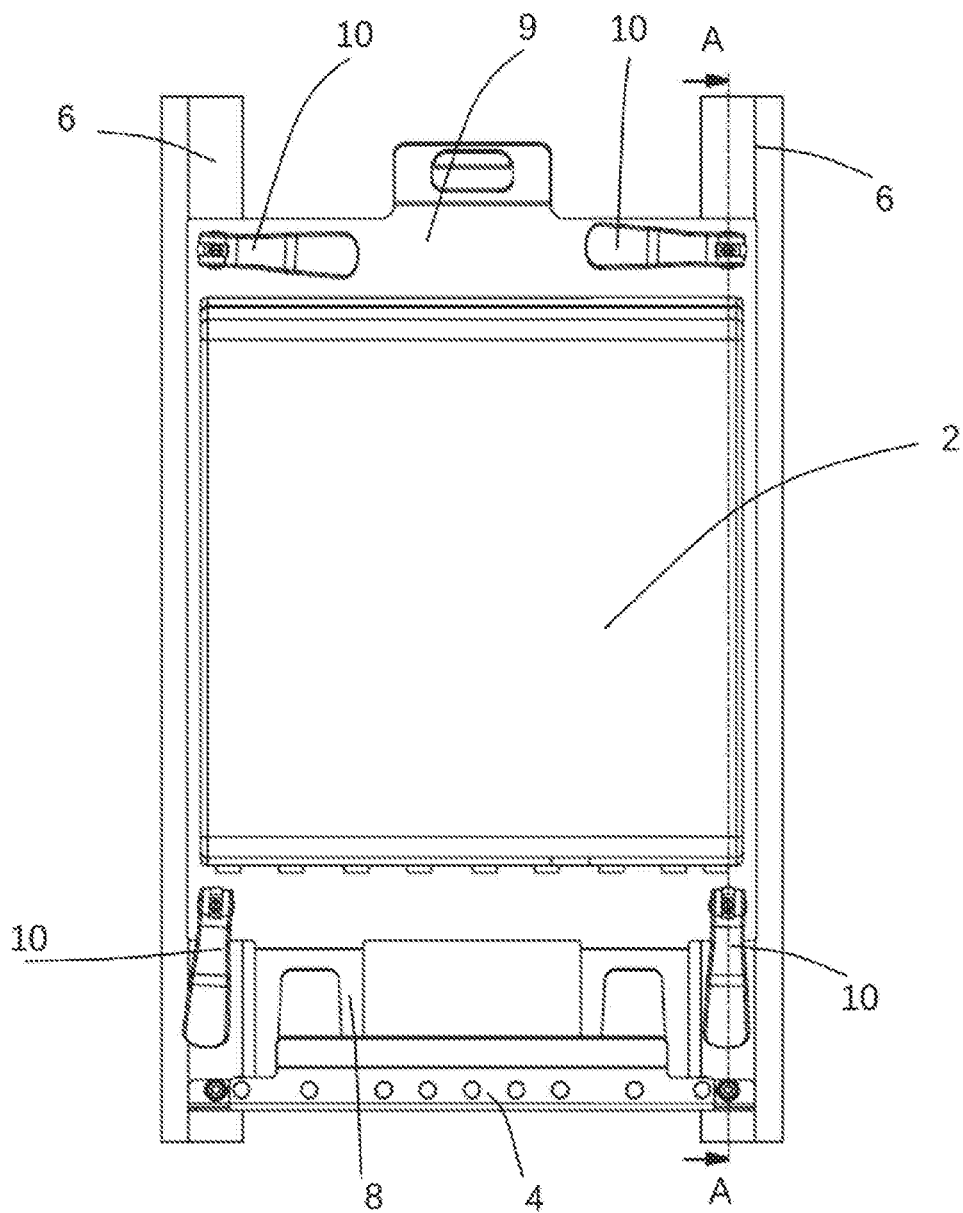
FIG. 4 is a partial top view of the BSA system of FIG. 1.
Figure 5:
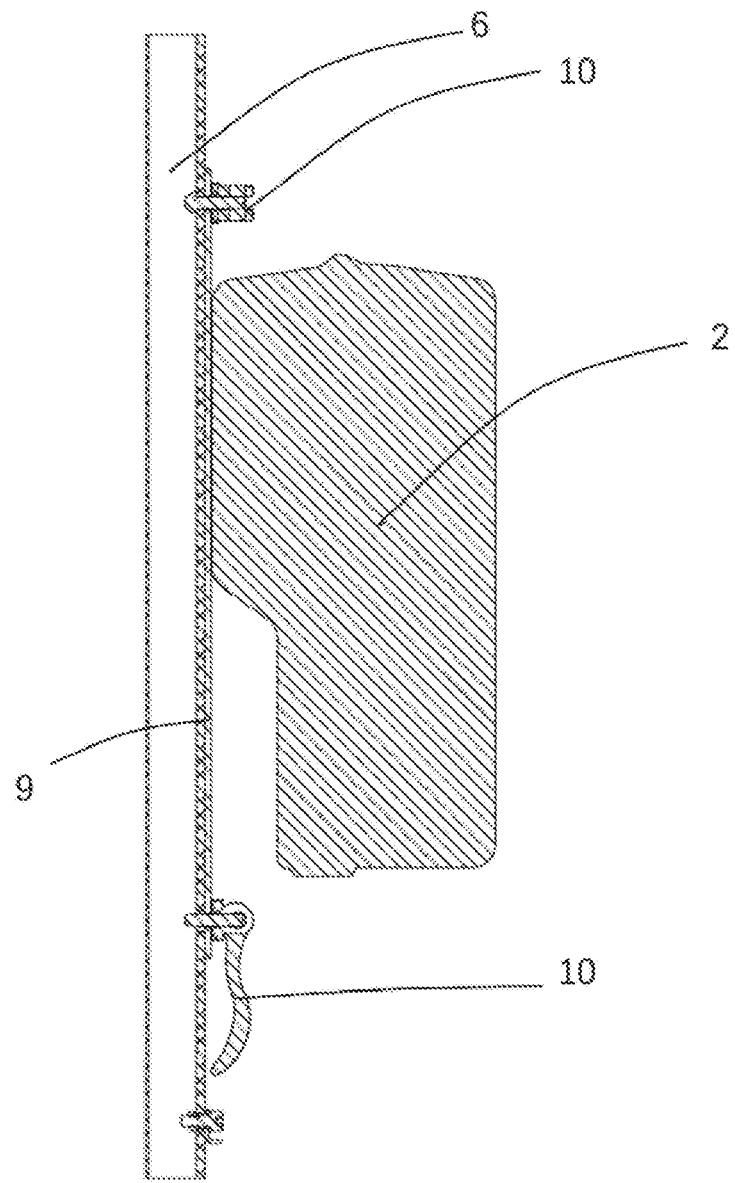
FIG. 5 is a sectional view along a section line A-A of FIG. 4.

When the RRU 2 is located at the predetermined installation position relative to the BSA 1, the RRU 2 may be fixed on the BSA 1 by means of a fixing device. FIG. 4 is a partial top view of the BSA system of FIG. 1, and FIG. 5 is a cross-sectional view along the section line A-A of FIG. 4. An embodiment of the fixing device is shown in FIGS. 4 and 5. The fixing device includes four quick locking devices 10 that are configured to lock the adapter plate 9 on the longitudinal beams 6, wherein each longitudinal beam 6 is associated with two quick locking devices 10 spaced apart from each other. For example, the longitudinal beams 6 and the adapter plate 9 may have non-circular mounting holes, and the quick locking devices 10 may be inserted into and pulled out of the mounting holes in a first orientation relative to the mounting holes, and may be held in the mounting holes in a second orientation different from the first orientation (for example, rotated 90 degree relative to the first orientation), and may be locked by pressing handles of the quick locking devices 10. It will also be appreciated that the adapter plate 9 may be fixed on the longitudinal beams 6 by means of bolt connections, and thus the RRU 2 is indirectly fixed on the BSA 1.

Figure 6C:
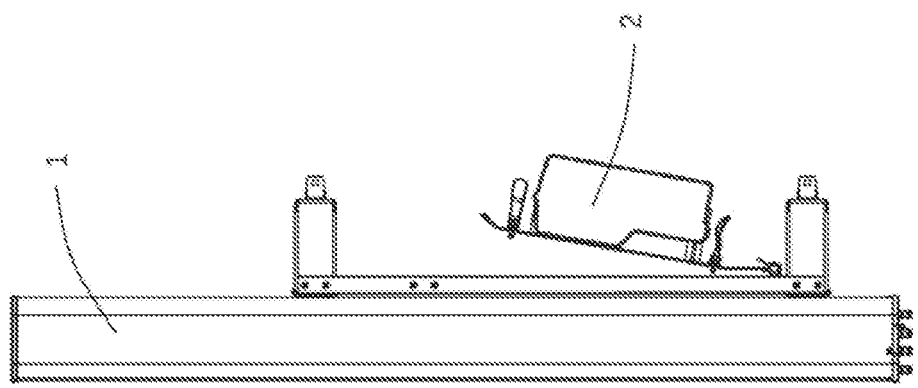
FIGS. 6A-6C are schematic views illustrating a mounting process of an RRU.
Figure 6B:
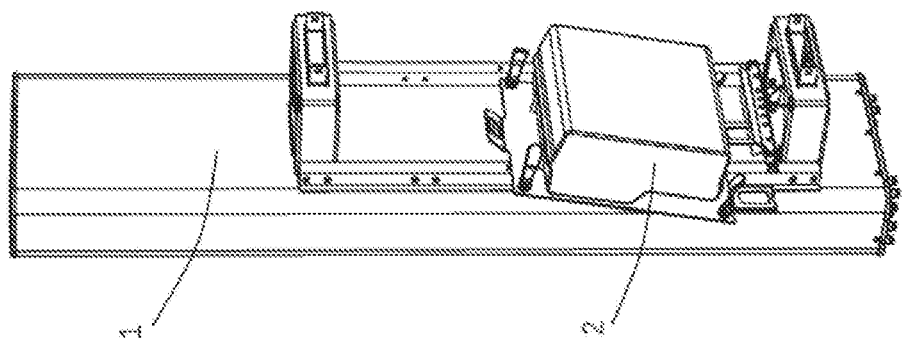
Figure 6A:
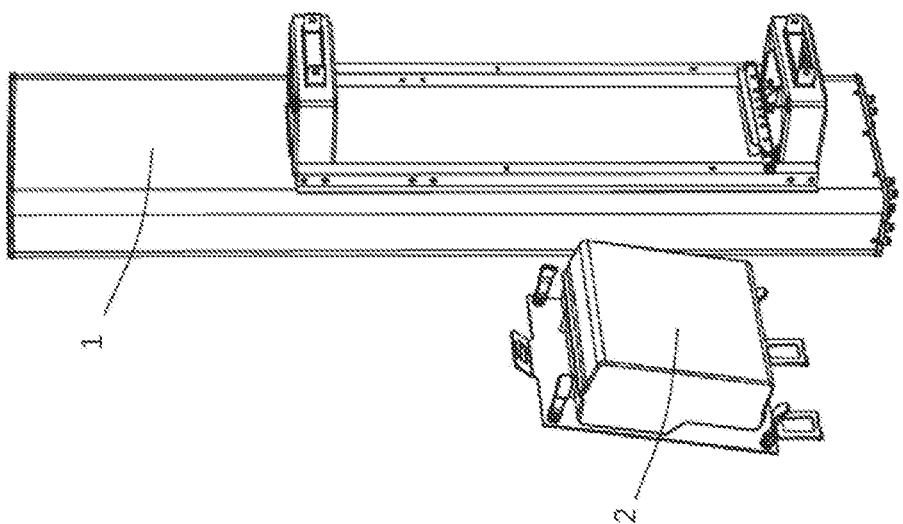

FIGS. 6A-6C are schematic views illustrating a mounting process of the RRU 2, wherein the BSA 1 has been mounted to a pole (not shown), and the RRU 2 is to be mounted to the BSA 1. As shown in FIG. 6A, first, the RRU 2 may be lifted to a side of a predetermined installation position. Then, the guide element 8 may be brought into the guide rail 4 and the RRU 2 may be pushed along the guide rail 4 in a transverse direction, until it reaches the predetermined installation position. FIG. 6B shows that the RRU 2 has been moved close to the predetermined installation position along the guide rail 4 in the transverse direction, and FIG. 6C shows that the RRU 2 has been moved to the predetermined installation position along the guide rail 4 in the transverse direction. Then, the RRU 2 may be rotated toward the BSA 1, so that the adapter plate 9 contacts the two longitudinal beams 6 of the mounting frame 5. Finally, the adapter plate 9 may be secured to the longitudinal beams by means of the quick locking devices 10 and hence fixation of the RRU 2 on the BSA 1 in the predetermined installation position may be achieved.

It will be understood that, the terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprise" and "include" (and variants thereof), when used in this specification, specify the presence of stated operations, elements, and/or components, but do not preclude the presence or addition of one or more other operations, elements, components, and/or groups thereof. As used herein, the term "and/or" includes any and all combinations of one or more of the associated listed items. Like reference numbers signify like elements throughout the description of the figures.

The thicknesses of elements in the drawings may be exaggerated for the sake of clarity. Further, it will be understood that when an element is referred to as being "on," "coupled to" or "connected to" another element, the element may be formed directly on, coupled to or connected to the other element, or there may be one or more intervening elements therebetween. In contrast, terms such as "directly on," "directly coupled to" and "directly connected to," when used herein, indicate that no intervening elements are present. Other words used to describe the relationship between elements should be interpreted in a like fashion (i.e., "between" versus "directly between", "attached" versus "directly attached," "adjacent" versus "directly adjacent", etc.).

Terms such as "top," "bottom," "upper," "lower," "above," "below," and the like are used herein to describe the relationship of one element, layer or region to another element, layer or region as illustrated in the figures. It will be understood that these terms are intended to encompass different orientations of the device in addition to the orientation depicted in the figures.

It will be understood that, although the terms "first," "second," etc. may be used herein to describe various elements, these elements should not be limited by these terms. These terms are only used to distinguish one element from another. Thus, a first element could be termed a second element without departing from the teachings of the inventive concept.

It will also be appreciated that all example embodiments disclosed herein can be combined in any way.

Finally, it is to be noted that, the above-described embodiments are merely for understanding the present invention but not constitute a limit on the protection scope of the present invention. For those skilled in the art, modifications may be made on the basis of the above-described embodiments, and these modifications do not depart from the protection scope of the present invention.

What is claimed is:

1. A mounting device for mounting a remote radio unit to a base station antenna, the mounting device comprising:
   a guide rail configured to be mounted to the base station antenna and extending transversely in a mounted state of the guide rail on the base station antenna; and
   a guide element configured to be mounted to the remote radio unit and movable along the guide rail in a mounted state of the guide element on the remote radio unit;
   wherein mounting device includes a mounting frame configured to be mounted to the base station antenna, the guide rail is mounted to the mounting frame, and a fixing device is configured to fix the remote radio unit on the mounting frame; and
   wherein the mounting frame includes two longitudinal beams that are parallel to each other and two connecting elements that connect the longitudinal beams to each other at ends of the longitudinal beams, and both of the connecting elements are configured to mount the base station antenna to a pole.

2. The mounting device for mounting the remote radio unit to the base station antenna as recited in claim 1, wherein the guide rail has opposite side walls that extend transversely and are configured to receive and guide the guide element between themselves in a mounted state of the guide rail on the base station antenna.

3. The mounting device for mounting the remote radio unit to the base station antenna as recited in claim 2, wherein the guide rail has a row of rollers defining a guide path for the guide element.

4. The mounting device for mounting a remote radio unit to a base station antenna as recited in claim 1, wherein the mounting device includes an adapter plate configured to be mounted to the remote radio unit, and the guide element is an integral part of the adapter plate.

5. The mounting device for mounting the remote radio unit to the base station antenna as recited in claim 1, wherein the fixing device includes a plurality of quick locking devices configured to lock the remote radio unit on the base station antenna at the predetermined installation position.

6. The mounting device for mounting a remote radio unit to a base station antenna as recited in claim 1, wherein the mounting device includes an adapter plate configured to be mounted to the remote radio unit, the guide element is an integral part of the adapter plate, and the fixing device includes four quick locking devices configured to lock the adapter plate to the longitudinal beams, wherein each longitudinal beam is associated with two quick locking devices spaced apart from each other.

7. The mounting device for mounting the remote radio unit to the base station antenna as recited in claim 1, wherein the guide rail is below the remote radio unit when the remote radio unit is mounted on the base station antenna.

8. The mounting device for mounting the remote radio unit to the base station antenna as recited in claim 1, further comprising a fixing device configured to fix the remote radio unit on the base station antenna at a predetermined installation position of the remote radio unit relative to the base station antenna.

9. A base station antenna system, comprising:
   a base station antenna;
   a remote radio unit; and
   a mounting device as defined in claim 1.

10. The system as recited in claim 9, wherein the guide rail has opposite side walls that extend transversely and are configured to receive and guide the guide element between themselves in a mounted state of the guide rail on the base station antenna.

11. The system as recited in claim 10, wherein the guide rail has a row of rollers defining a guide path for the guide element.

12. The system as recited in claim 9, wherein the mounting device includes an adapter plate configured to be mounted to the remote radio unit, and the guide element is an integral part of the adapter plate.

* * * * *